(12) United States Patent
Langton et al.

(10) Patent No.: US 10,110,496 B2
(45) Date of Patent: Oct. 23, 2018

(54) PROVIDING POLICY INFORMATION ON AN EXISTING COMMUNICATION CHANNEL

(71) Applicant: Juniper Networks, Inc., Sunnyvale, CA (US)

(72) Inventors: Jacob Asher Langton, Oakland, CA (US); Kyle Adams, Brisbane, CA (US); Daniel J. Quinlan, San Francisco, CA (US); Declan Conlon, Sydney (AU)

(73) Assignee: Juniper Networks, Inc., Sunnyvale, CA (US)

( * ) Notice: Subject to any disclaimer, the term of this patent is extended or adjusted under 35 U.S.C. 154(b) by 227 days.

(21) Appl. No.: 14/674,787

(22) Filed: Mar. 31, 2015

(65) Prior Publication Data

US 2016/0294703 A1 Oct. 6, 2016

(51) Int. Cl.
*G06F 15/16* (2006.01)
*H04L 12/813* (2013.01)
(Continued)

(52) U.S. Cl.
CPC .......... *H04L 47/20* (2013.01); *H04L 41/0893* (2013.01); *H04L 63/0428* (2013.01);
(Continued)

(58) Field of Classification Search
CPC ..... H04L 47/20; H04L 67/02; H04L 63/0428; H04L 63/1441; H04L 41/0893; H04L 45/30
(Continued)

(56) References Cited

U.S. PATENT DOCUMENTS 7,533,265 B2 * 5/2009 Ballinger ............ H04L 63/0428
713/172
7,747,730 B1 * 6/2010 Harlow ............... H04L 12/2697
709/202

(Continued)

FOREIGN PATENT DOCUMENTS

WO WO 2013/172898 11/2013

OTHER PUBLICATIONS

Extended European Search Report for Corresponding European Application No. 15179109.2 dated Jul. 28, 2016, 14 pages.
(Continued)

*Primary Examiner* — Michael Y Won
(74) *Attorney, Agent, or Firm* — Harrity & Harrity, LLP (57) ABSTRACT

A device may receive or generate a message for routing to a destination on a communication channel. The communication channel may have been established between a source and the destination. The device may perform a first determination of policy information related to at least one of the message, the destination, or the source of the message. The policy information may describe an action for a network device to perform. The device may associate a policy token with the message. The policy token may describe or identify the policy information. The device may provide the message with the associated policy token to the network device on the communication channel to cause the network device to perform a second determination of the policy information based on the policy token, to perform the action described by the policy information, and to provide the message on the communication channel.

20 Claims, 7 Drawing Sheets

(51) Int. Cl.
  *H04L 29/08* (2006.01)
  *H04L 29/06* (2006.01)
  *H04L 12/24* (2006.01)
  *H04L 12/725* (2013.01)

(52) U.S. Cl.
  CPC .......... *H04L 63/1441* (2013.01); *H04L 67/02* (2013.01); *H04L 45/30* (2013.01)

(58) Field of Classification Search
  USPC ....... 709/201, 220, 230, 238, 202, 203, 227, 709/228, 229, 232, 236, 242, 244, 246
  See application file for complete search history.

(56) References Cited

U.S. PATENT DOCUMENTS

| | | | |
|---|---|---|---|
| 7,782,881 B1 | 8/2010 | O'Toole, Jr. et al. | |
| 8,819,164 B2* | 8/2014 | Abzarian | G06F 8/71 709/217 |
| 8,972,518 B2* | 3/2015 | Hecht | G06Q 10/10 709/203 |
| 9,252,972 B1* | 2/2016 | Dukes | H04L 12/569 |
| 2001/0039576 A1* | 11/2001 | Kanada | H04L 41/0893 709/223 |
| 2005/0080914 A1* | 4/2005 | Lerner | G06F 9/546 709/230 |
| 2006/0015625 A1* | 1/2006 | Ballinger | H04L 67/02 709/229 |
| 2006/0059117 A1* | 3/2006 | Tolson | G06F 21/604 |
| 2006/0090196 A1* | 4/2006 | van Bemmel | G06F 21/6218 726/4 |
| 2006/0168332 A1* | 7/2006 | Pfitzmann | G06F 21/6209 709/238 |
| 2006/0259949 A1* | 11/2006 | Schaefer | G06F 17/30082 726/1 |
| 2008/0005204 A1* | 1/2008 | Prus | G11B 27/002 |
| 2008/0016550 A1* | 1/2008 | McAlister | H04L 63/105 726/1 |
| 2008/0316922 A1* | 12/2008 | Riddle | H04L 41/0893 370/230 |
| 2009/0063584 A1* | 3/2009 | Abzarian | G06F 8/71 |
| 2009/0109845 A1* | 4/2009 | Andreasen | H04L 41/0893 370/230 |
| 2009/0113517 A1 | 4/2009 | Engdahl et al. | |
| 2009/0190585 A1* | 7/2009 | Allen | H04L 12/5835 370/390 |
| 2009/0235325 A1* | 9/2009 | Dimitrakos | G06F 9/546 726/1 |
| 2010/0043047 A1* | 2/2010 | Archer | H04L 63/1416 726/1 |
| 2011/0149962 A1 | 6/2011 | Ait-Ameur | |
| 2011/0164752 A1* | 7/2011 | Wainner | H04L 63/0428 380/277 |
| 2011/0209196 A1* | 8/2011 | Kennedy | G06F 21/55 726/1 |
| 2012/0094685 A1* | 4/2012 | Marsico | H04W 4/021 455/456.1 |
| 2012/0278898 A1* | 11/2012 | Nguyen | G06F 21/10 726/27 |
| 2013/0117847 A1* | 5/2013 | Friedman | H04L 63/102 726/22 |
| 2013/0148659 A1* | 6/2013 | Shukla | H04L 61/6045 370/390 |
| 2013/0340033 A1* | 12/2013 | Jones | H04W 12/08 726/1 |
| 2014/0229593 A1* | 8/2014 | Burke | H04L 63/20 709/223 |
| 2014/0307544 A1* | 10/2014 | Dong | H04L 47/2441 370/229 |
| 2015/0134618 A1* | 5/2015 | Teterin | G06F 11/1456 707/654 |
| 2015/0208335 A1* | 7/2015 | Vrbaski | H04W 48/18 455/426.1 |
| 2015/0341329 A1* | 11/2015 | Mosko | H04L 63/08 726/3 |
| 2015/0381761 A1* | 12/2015 | Suni | H04W 4/003 709/203 |
| 2016/0088023 A1* | 3/2016 | Handa | G06F 17/30899 726/1 |
| 2016/0234256 A1* | 8/2016 | Roach | H04L 9/32 |

OTHER PUBLICATIONS

Sahay et al., "Towards Autonomic DDoS Mitigation using Software Defined Networking," Proceedings 2015 Workshop on Security of Emerging Networking Technologies, Feb. 8, 2015, 7 pages.

* cited by examiner

PROVIDING POLICY INFORMATION ON AN EXISTING COMMUNICATION CHANNEL

BACKGROUND

A network may include a client device and a group of network devices (e.g., routers, switches, firewalls, hubs, etc.). The client device may communicate via the group of network devices on an existing communication channel (e.g., a hypertext transfer protocol (HTTP) channel, a file transfer protocol (FTP) channel, etc.). The group of network devices may intercommunicate to facilitate the communication and/or to ensure security of the network.

SUMMARY

According to some possible implementations, a device may include one or more processors. The one or more processors may receive or generate a message for routing to a destination on a communication channel. The communication channel may have been established between a source and the destination. The one or more processors may perform a first determination of policy information related to at least one of the message, the destination, or the source of the message. The policy information may describe an action for a network device to perform. The one or more processors may associate a policy token with the message. The policy token may describe or identify the policy information. The one or more processors may provide the message with the associated policy token to the network device on the communication channel to cause the network device to perform a second determination of the policy information based on the policy token, to perform the action described by the policy information, and to provide the message on the communication channel.

According to some possible implementations, a computer-readable medium may store one or more instructions that, when executed by one or more processors of a device, cause the one or more processors to receive or generate a message for routing to a destination on a communication channel. The communication channel may have been established between a source and the destination. The one or more instructions may cause the one or more processors to determine policy information related to the message. The policy information may describe an action for a network device to perform, and may describe information related to at least one of the destination or the source. The one or more instructions may cause the one or more processors to associate, with the message, a policy token that describes or identifies the policy information. The one or more instructions may cause the one or more processors to provide the message and the policy token to the network device on the communication channel to permit the network device to determine the policy information based on the policy token, and to provide the message to the destination on the communication channel.

According to some possible implementations, a method may include receiving, by a device and from a source, a message for routing to a destination on a communication channel. The communication channel may have been established between a source and the destination. The method may include determining, by the device, policy information associated with at least one of the message, the source, or the destination. The policy information may describe an action for a network device to perform. The method may include associating, by the device, the message with a policy token. The policy token describing or identifying, to the network device, the policy information. The method may include providing, by the device, the message and the policy token to the network device on the communication channel to permit or cause the network device to determine the policy information based on the policy token, and to perform the action described by the policy information.

DETAILED DESCRIPTION

The following detailed description of example implementations refers to the accompanying drawings. The same reference numbers in different drawings may identify the same or similar elements.

A network may include a client device and a group of network devices (e.g., a firewall, a router, a gateway, a switch, a hub, a bridge, a reverse proxy, a server, a proxy server, a security device, an intrusion detection device, a load balancer, etc.). The group of network devices may communicate to provide network access to the client device. For example, the group of network devices may send messages to and/or receive messages from the client device on an existing communication channel (e.g., a Hypertext Transfer Protocol (HTTP) request and/or response on an existing HTTP channel, a File Transfer Protocol (FTP) request and/or response on an existing FTP channel, etc.). The existing communication channel may prescribe a format of messages and/or indicate one or more network devices to route the messages, provide the messages, receive the messages, or the like. The group of network devices may want to intercommunicate information related to the client device without alerting the client device or another party of the intercommunication. For example, the group of network devices may want to communicate, among the group of network devices, information indicating that the client device may be compromised by a malicious party, information related to permitting or denying the client device access to a resource, or the like.

Implementations described herein may enable the group of network devices to intercommunicate without alerting the client device and/or the malicious party. A first network device may receive a message originating from and/or en route to a client device on an existing communication channel. The first network device may determine policy information related to the client device, related to a source of the message, and/or related to a destination of the message, and may associate the message with a policy token that describes the policy information.

The first network device may provide the message and the policy token to other network devices on the existing communication channel. The other network devices may determine the policy information based on the policy token, may perform an action based on the policy information, and/or may remove the policy token before providing the message to a destination of the message (e.g., to the client device, to an external device, etc.) on the existing communication channel. In this way, the first network device may provide a policy token to the other network devices in association with a message originating from and/or en route to the client device. By providing the policy token on an existing communication channel, the first network device may ensure that the policy token is provided to other network devices that are in a path of the existing communication channel, and may ensure that the client device will provide and/or receive messages to carry the policy token along the existing communication channel. By removing the policy tokens before providing the message to the destination, the network device and/or the other network devices may ensure that the client device and/or an entity associated with the destination (e.g., a malicious party) are unaware of the policy information.

Figure 1:
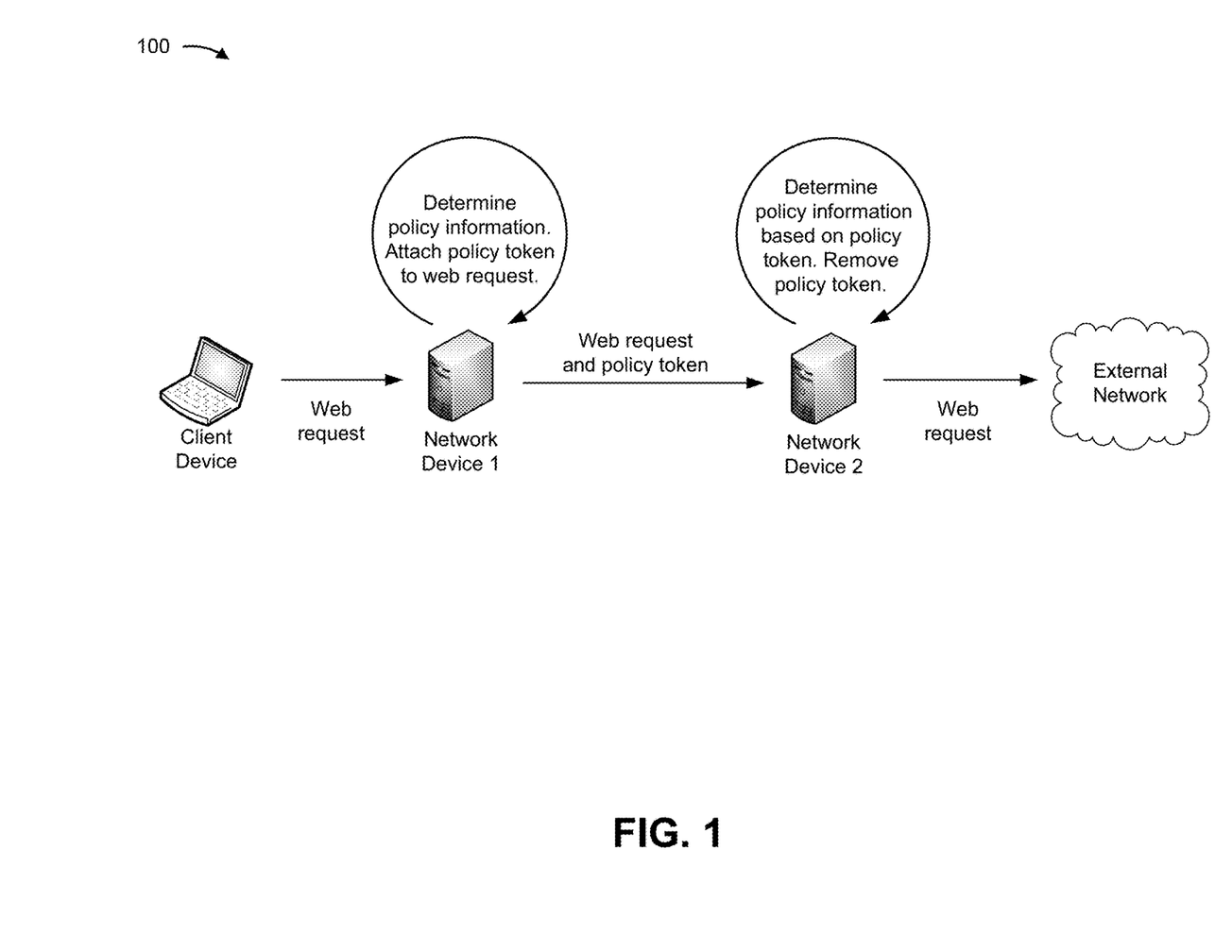
FIG. 1 is a diagram of an overview of an example implementation described herein.

FIG. 1 is a diagram of an overview of an example implementation 100 described herein. As shown in FIG. 1, a client device may provide a message (e.g., shown as "Web Request") to a first network device (e.g., shown as "Network Device 1") for routing to an external network. Assume that the client device provides the message on an existing communication channel (e.g., an HTTP request channel, or the like). As shown, the first network device may determine policy information. Assume that the policy information is associated with the client device and/or a device associated with the external network. As shown, the first network device may attach a policy token to the message. Assume that the policy token describes or identifies the policy information.

As further shown, the first network device may provide the message and the policy token to a second network device (e.g., shown as "Network Device 2"). As shown, the second network device may determine the policy information based on the policy token. Assume that the policy information indicates an action to perform related to the client device and/or the external network, and assume that the policy information indicates to remove the policy token from the message before providing the message to the external network. Assume that the second network device performs the action indicated by the policy information. As shown, the second network device may remove the policy token from the message. As further shown, the second network device may provide the message, without the policy token, to the external network.

In this way, network devices of a network may intercommunicate information using messages communicated on an existing communication channel. The existing communication channel may be necessary to a function of a client device, which may ensure that messages are regularly transmitted on the existing communication channel. Network devices associated with the existing communication channel may intercommunicate information using tokens associated with (e.g., attached to, included in, etc.) the messages, and may conceal the policy information from the client device and/or a malicious party by removing the tokens before providing the messages to a destination.

Figure 2:
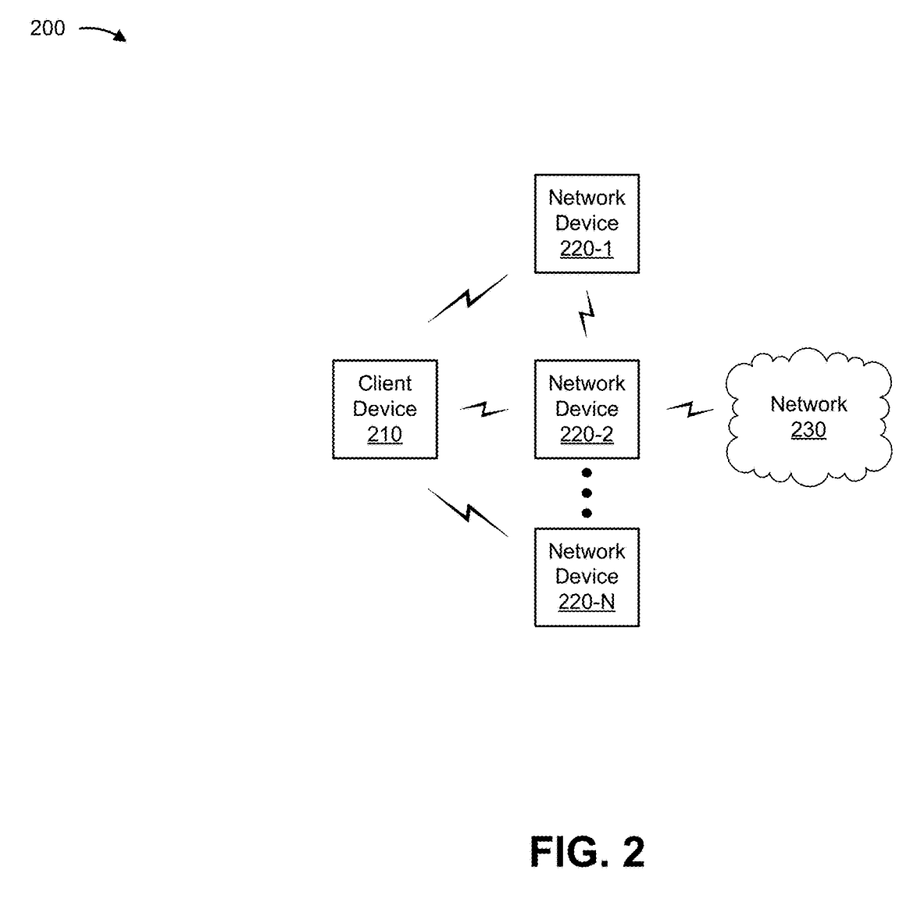
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a set of network devices 220-1 to 220-N (N≥1) (hereinafter referred to collectively as "network devices 220," and individually as "network device 220"), and network 230. Devices of environment 200 may interconnect based on wired connections, wireless connections, or a combination of wired and wireless connections.

Client device 210 may include one or more devices capable of receiving and/or providing information over a network (e.g., network 230), and/or capable of generating, storing, and/or processing information received and/or provided over the network. For example, client device 210 may include a computing device, such as a laptop computer, a tablet computer, a handheld computer, a desktop computer, a mobile phone (e.g., a smart phone, a radiotelephone, etc.), a gaming device, a network device (e.g., a router, a gateway, a firewall, a hub, a bridge, an access point, etc.), or a similar device. Client device 210 may act as an endpoint (e.g., a source and/or a destination) for a message on an existing communication channel. For example, a first client device 210 may provide an HTTP request, an FTP request, a system message, a network message, an email message, a text message, or the like, to a second client device 210 and/or another device (e.g., via network device 220).

Network device 220 may include one or more devices (e.g., one or more traffic transfer devices) capable of receiving, storing, generating, processing, and/or providing network traffic. For example, network device 220 may include a firewall, a router, a gateway, a switch, a hub, a bridge, a reverse proxy, a server (e.g., a proxy server), a security device, an intrusion detection device, a load balancer, or a similar device. In some implementations, network device 220 may receive, process, and/or provide a message on an existing communication channel. Network device 220 may determine policy information (e.g., based on a policy token, based on locally stored information, based on remotely stored information, etc.), and may generate and/or provide a policy token that describes the policy information to another device (e.g., to a second network device 220 and in association with a message) to communicate the policy information.

Network 230 may include one or more wired and/or wireless networks. For example, network 230 may include a cellular network, a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
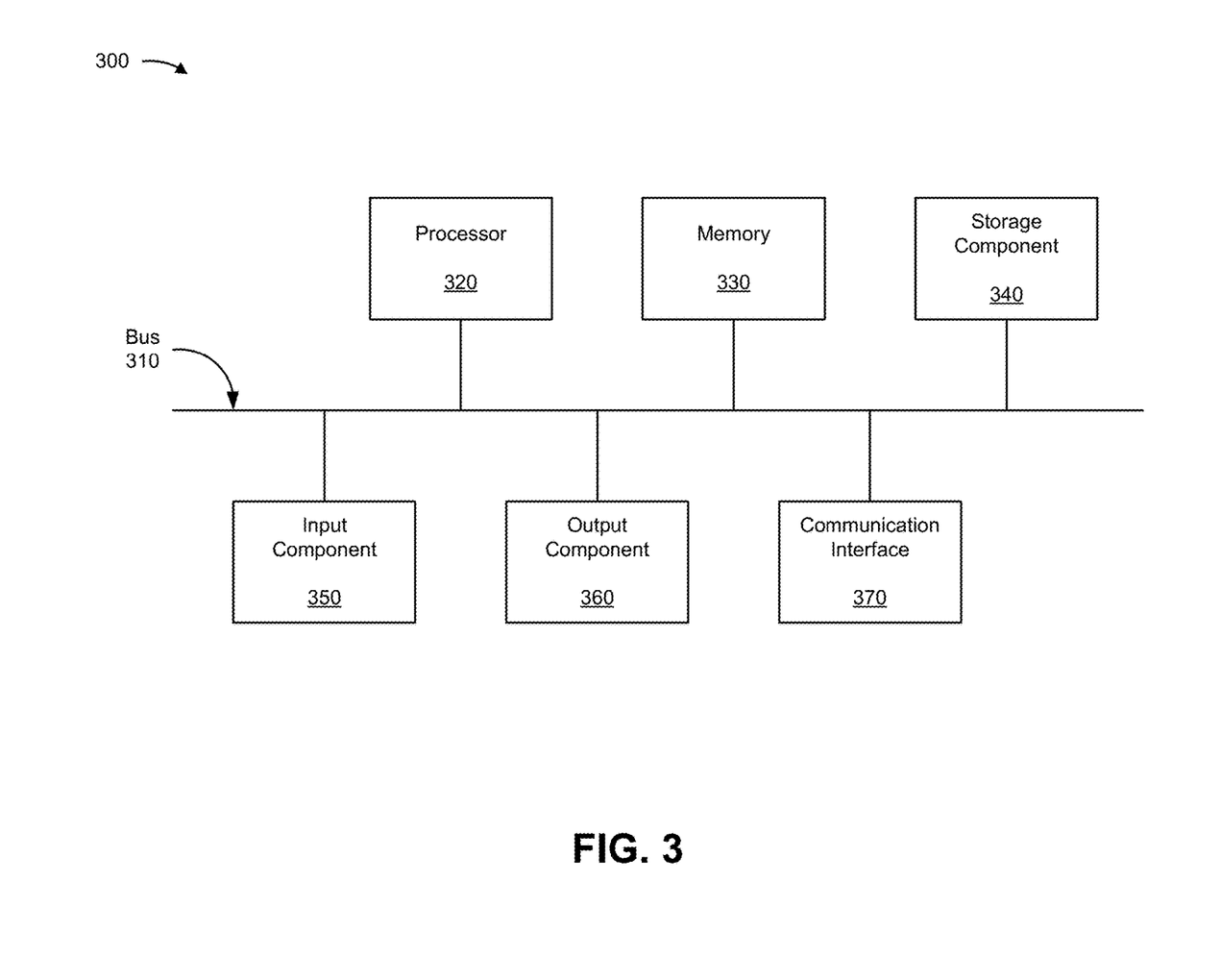
FIG. 3 is a diagram of example components of one or more devices of FIG. 2.

FIG. 3 is a diagram of example components of a device 300. Device 300 may correspond to client device 210 and/or network device 220. In some implementations, client device 210 and/or network device 220 may include one or more devices 300 and/or one or more components of device 300.

As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
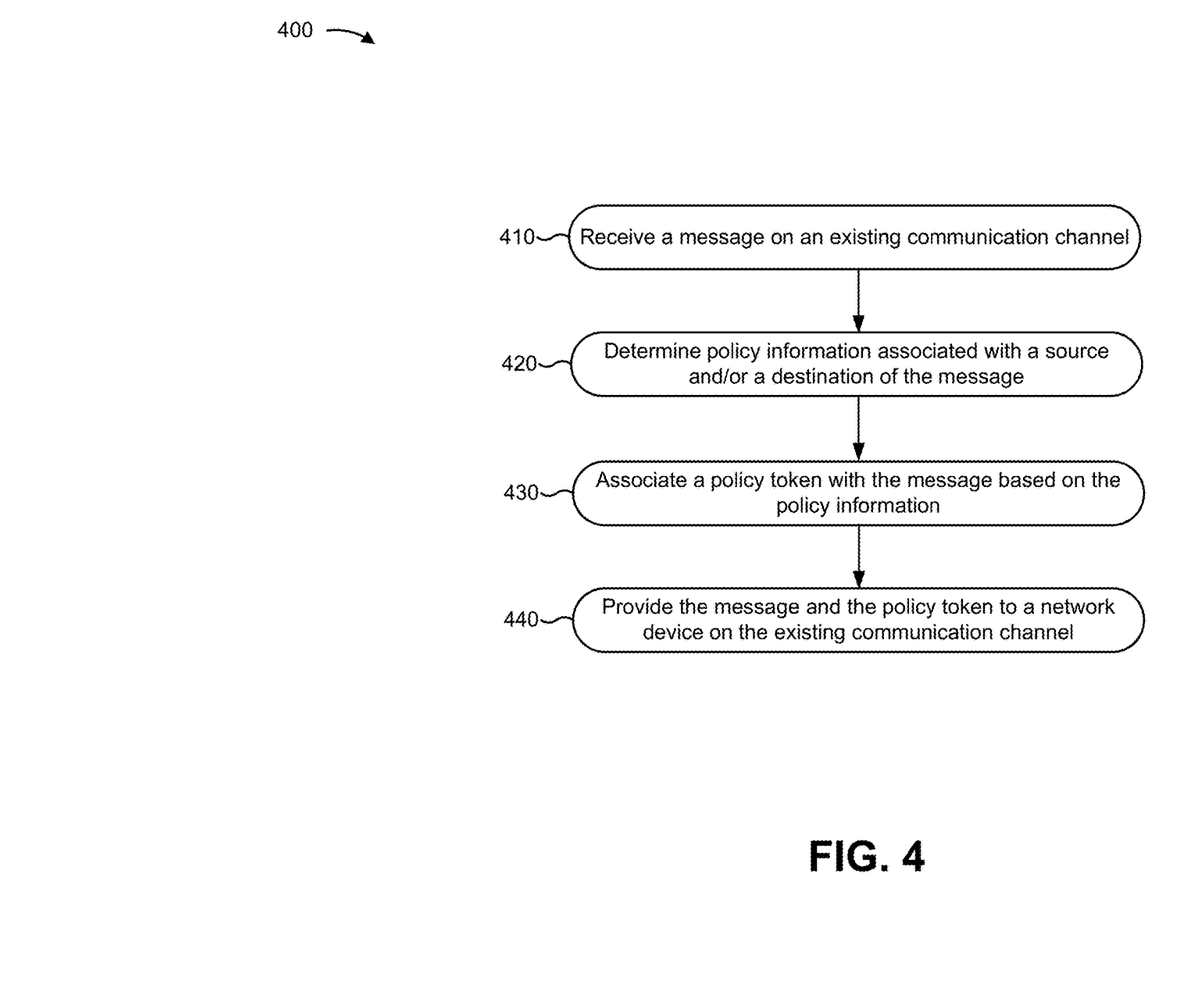
FIG. 4 is a flow chart of an example process for determining and providing a policy token in association with a message on an existing communication channel.

FIG. 4 is a flow chart of an example process 400 for determining and providing a policy token in association with a message on an existing communication channel. In some implementations, one or more process blocks of FIG. 4 may be performed by network device 220. In some implementations, one or more process blocks of FIG. 4 may be performed by another device or a set of devices separate from or including network device 220, such as client device 210.

As shown in FIG. 4, process 400 may include receiving a message on an existing communication channel (block 410). For example, network device 220 may receive a message on an existing communication channel. In some implementations, client device 210 may generate a request to establish a communication channel with a destination device (e.g., another client device 210, a server, or the like). Client device 210 may output the request, which may be received by network device 220. Network device 220 may communicate with one or more other network devices 220 to establish a communication channel between client device 210 and the destination device. In some implementations, network device 220 may establish a communication channel based on a request from the destination device rather than client device 210. Network device 220 may receive the message from client device 210 communicated via the existing communication channel en route to the destination device. In some implementations, network device 220 may receive the message en route to client device 210 from a source (e.g., from another network device 220, from a device external to a network that includes network device 220, or the like). Network device 220 may determine policy information based on client device 210, the source, and/or the destination, and may attach a policy token to the message to communicate the policy information (e.g., to other network devices 220).

As described above, network device 220 may receive the message via an existing communication channel. The existing communication channel may include a network protocol, a messaging protocol, or the like, based on which client device 210, network device 220, and/or other devices customarily communicate. For example, the existing communication channel may include a hypertext transfer protocol (HTTP) channel, a file transfer protocol (FTP) channel, a system messaging channel (e.g., a Windows messaging channel, or the like), a network messaging channel, an email messaging channel, a text messaging channel, a short form messaging channel, or the like. Client device 210 may use the existing communication channel to transmit and/or receive messages. Network device 220 may use the messages to carry policy tokens on the existing communication channel, which may allow network device 220 to provide information to other network devices 220 included in a path of the existing communication channel.

The message may include a request (e.g., an HTTP request, an FTP request, or the like), a response to a request (e.g., a response to an HTTP request, a response to an FTP request, or the like), a network message (e.g., a network message generated by client device 210, by network device 220, by an external source such as a device associated with another network, or the like), a text message, a short form message, or the like. In short, the message may be of a type associated with an existing communication channel. In some implementations, the message may facilitate attachment and/or inclusion of a policy token (e.g., by including a blank header, a blank footer, an unused portion of the message, or the like). Network device 220 may attach and/or include a policy token in the blank header, in the blank footer, in the unused portion of the message, or the like, which may allow network devices 220 to intercommunicate policy information without generating additional messages.

In some implementations, the message may originate from client device 210. For example, client device 210 may provide an HTTP request, an FTP request, a system message, a network message, or the like, to network device 220 (e.g., for routing to a destination of the message) on the existing communication channel. In other implementations, the message may originate from an external source (e.g., a device associated with or external to a network that includes network device 220). For example, network device 220 may receive a response to an HTTP request, a response to an FTP request, a system message, a network message, or the like, from an external source. In some implementations, network device 220 may receive the message from the external source based on a message provided to the external source by client device 210 (e.g., may receive the message in response to an HTTP request by client device 210, an FTP request by client device 210, or the like).

As further shown in FIG. 4, process 400 may include determining policy information associated with a source and/or a destination of the message (block 420). For example, network device 220 may determine policy information associated with a source and/or a destination of the message. In some implementations, network device 220 may determine the policy information based on locally stored information. In some implementations, network device 220 may determine the policy information based on remotely stored information. In some implementations, network device 220 may determine the policy information based on a policy token. Network device 220 may use the policy information to generate and/or provide, to another network device 220, a policy token that describes the policy information.

In some implementations, the policy information may indicate an action to perform related to the message (e.g., a source of the message, a destination of the message, etc.) and/or client device 210. For example, the policy information may indicate to monitor and/or quarantine client device 210, may indicate to redirect network traffic to and/or from client device 210, may indicate to block network traffic originating from and/or destined to client device 210, may indicate to add information to a blacklist, may indicate to notify a network administrator and/or a user of client device 210, may indicate to deliver the message to the destination, or the like, as described in more detail below in connection with FIG. 5.

Additionally, or alternatively, the policy information may include other information (e.g., information that describes client device 210, information that describes programs, applications, and/or operating systems associated with client device 210, information that identifies a time zone associated with client device 210, information for network optimization purposes, information for packet prioritization purposes, etc.). For example, the policy information may identify an operating system associated with client device 210, and one or more network devices 220 may determine information and/or perform an action based on the policy information that identifies the operating system (e.g., may encode media files associated with the policy information based on the operating system, etc.).

In some implementations, network device 220 may determine policy information based on a source and/or destination of the message. For example, network device 220 may store and/or access policy information associated with a particular source and/or destination, a particular type of source and/or destination (e.g., a type of device, a type of website, etc.), a classification of source and/or destination (e.g., a geographical origin of the source and/or destination, a classification of the source and/or destination as compromised and/or unsafe, etc.), or the like. In some implementations, network device 220 may determine the policy information based on a list of sources and/or destinations (e.g., a blacklist that lists sources and/or destinations to be blocked and/or banned, a whitelist that lists sources and/or destinations that are deemed acceptable, a graylist that lists sources and/or destinations that are subject to a particular rule, etc.).

As further shown in FIG. 4, process 400 may include associating a policy token with the message based on the policy information (block 430). For example, network device 220 may associate a policy token with the message based on the policy information. The policy token may indicate the policy information to other network devices 220 (e.g., that may receive the message and the policy token from network device 220). In some implementations, another device may associate the policy token with the message (e.g., client device 210, or another device).

The policy token may include one or more characters that indicate policy information. For example, the policy token may include a string that defines the policy information, a network address (e.g., a web address, an Internet Protocol (IP) address, etc.) of a device that stores the policy information for network device 220 to request the policy information, one or more characters corresponding to policy information stored by network device 220, or the like. In some implementations, the policy token may include an indicator to remove the policy token before providing the policy token to a destination.

In some implementations, the policy token may be encrypted. For example, network device 220 may encrypt the policy token before attaching and/or providing the policy token. In some implementations, network device 220 may encrypt the policy token based on a security key, and may provide the security key to other network devices 220. The other network devices 220 may decrypt the policy token (e.g., using the security key) to determine policy information. As another example, a first network device 220 and a second network device 220 may share symmetric keys. The first network device 220 may encrypt the policy token using a symmetric-key algorithm (e.g., a Twofish algorithm, a Serpent algorithm, a Blowfish algorithm, a CASTS algorithm, etc.) based on the symmetric key, and may provide the policy token to the second network device 220 for decryption to determine policy information. This may enable the first network device 220 and the second network device 220 to communicate using a shared symmetric key, which may improve security of the encrypted policy token. By encrypting and/or decrypting the policy token, network devices 220 may improve security of the network, and may further impede a malicious party from accessing the policy information.

In some implementations, the policy token may be encrypted using a public and/or a private key. For example, assume that a first network device 220 holds a private key that corresponds with a public key. Assume that a second network device 220 holds the public key. In this case, the first network device 220 may attach and encrypt a policy token (e.g., using a public-key encryption algorithm, such as an RSA algorithm, or the like) using the private key, and may transmit the message and the policy token to the second network device 220. The second network device 220 may decrypt the message using the corresponding public key. As another example, the second network device 220 may encrypt the policy token using the public key and may provide the message and the policy token to the first network device 220. The first network device 220 may decrypt the policy token using the corresponding private key. In this way, two or more network devices 220 may communicate policy information using policy tokens encrypted using a public key and a corresponding private key, which may prevent client device 210, other network devices 220, and/or a malicious party from decrypting the policy token.

In some implementations, client device 210 may attach a policy token to a message originating from client device 210. For example, assume that an application hosted by client device 210 is configured to detect if a malicious party compromises client device 210. Assume further that, upon detecting that the malicious party has compromised client device 210, the application attaches a policy token to a message provided by client device 210 on an existing communication channel. The policy token may indicate to network device 220 that the malicious party has compromised or is attempting to compromise client device 210. Network device 220 may perform an action based on the policy token attached to the message by the application (e.g., may quarantine client device 210, may warn a user of client device 210, may drop traffic associated with client device 210, or the like). In some implementations, client device 210 may include a policy token as client device 210 generates a message. For example, client device 210 may generate a message that includes a policy token. In this way, an application associated with client device 210 may provide, on an existing communication channel, a policy token indicating that client device 210 has been compromised, which may allow network device 220 to take appropriate action.

As further shown in FIG. 4, process 400 may include providing the message and the policy token to a network device on the existing communication channel (block 440). For example, a first network device 220 may provide the message and the policy token to a second network device 220 (e.g., a second network device 220 in a path of the existing communication channel). In some implementations, client device 210 may provide the message and the policy token to the second network device 220. The second network device 220 may determine policy information based on the policy token and/or may perform an action based on the policy information, as described in more detail below in connection with FIG. 5.

In some implementations, a first network device 220 may provide the message and the policy token to a second network other than the first network associated with the first network device 220. For example, the first network device 220 may provide the message and the policy token to the second network via the Internet, via a device that connects the first network and the second network, or the like. A second network device 220 associated with the second network may receive the message and the policy token, may determine policy information based on the policy token, and/or may perform an action based on the policy information. In this way, network devices 220 may communicate policy information between a first network and a second network, which may enable the network devices 220 to perform actions related to the policy information in the first network and/or the second network.

In some implementations, a first network device 220 associated with a first network may encrypt the policy token using a security key, such as a symmetric key shared by a second network device 220 that is associated with a second network, a public key corresponding to a private key held by the second network device 220, a private key corresponding to a public key held by the second network device 220, or the like. The first network device 220 may provide the message and the encrypted policy token to the second network device 220. The second network device 220 may decrypt the policy token based on the security key to determine policy information. In this way, network devices 220 may encrypt policy tokens transmitted between different networks, which may enable the network devices 220 to securely communicate policy information between network devices 220 of the different networks.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
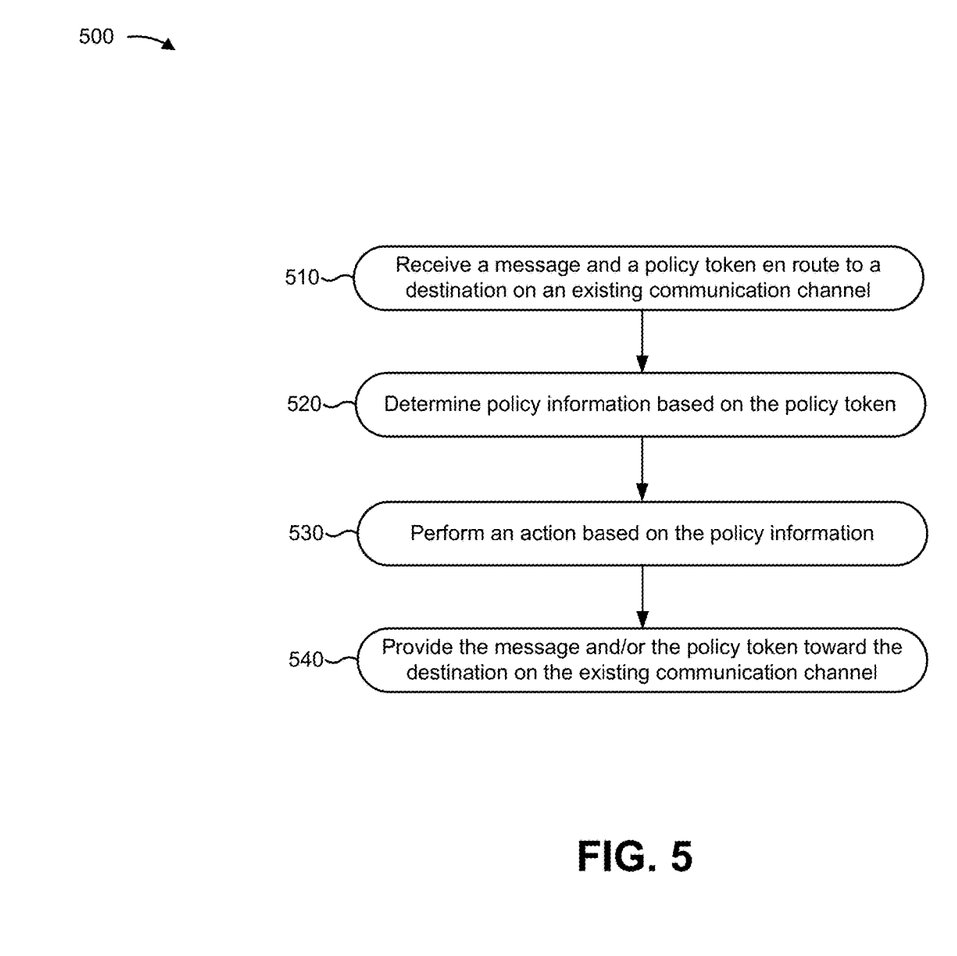
FIG. 5 is a flow chart of an example process for receiving a message and a policy token on an existing communication channel and performing an action based on the policy token.

FIG. 5 is a flow chart of an example process 500 for receiving a message and a policy token on an existing communication channel and performing an action based on the policy token. In some implementations, one or more process blocks of FIG. 5 may be performed by network device 220. In some implementations, one or more process blocks of FIG. 5 may be performed by another device or a set of devices separate from or including network device 220, such as client device 210.

As shown in FIG. 5, process 500 may include receiving a message and a policy token en route to a destination on an existing communication channel (block 510). For example, network device 220 may receive a message and a policy token. Network device 220 may receive the message and the policy token en route to a destination (e.g., en route to client device 210, to an external network, to an external website, to an external device, or the like). Network device 220 may use the policy token to determine policy information associated with the message, with a source of the message, and/or with the destination of the message.

In some implementations, network device 220 may receive the message and the policy token from another network device 220. For example, a first network device 220 may associate a policy token with a message, and may provide the message and the policy token to a second network device 220. In some implementations, the second network device 220 may be an edge network device (e.g., a network device 220 at an edge of a network that provides messages to and/or receives messages from devices external to the network), a core network device (e.g., a network device 220 that provides messages between devices of a network, such as client device 210 and/or network device 220). An edge network device 220 may receive the message and the policy token from client device 210 and/or a core network device 220 (e.g., based on client device 210 or the core network device 220 associating the message and the policy token). A core network device 220 may receive the message and the policy token from client device 210, from another core network device 220, or from an edge network device 220. Network device 220 may use the message and the policy token to determine policy information and/or may perform an action related to the policy information, as described in more detail below.

As further shown in FIG. 5, process 500 may include determining policy information based on the policy token (block 520). For example, network device 220 may read the policy token to determine policy information based on the policy token. Network device 220 may perform an action based on the policy information, as described in more detail elsewhere herein.

In some implementations, network device 220 may determine the policy information based on the policy token. For example, the policy token may define the policy information (e.g., "quarantine client device 210," "drop message associated with this policy token," or the like). By defining the policy information in the policy token, network device 220 may reduce local storage requirements for policy information and/or bandwidth requirements to determine remotely stored policy information.

In some implementations, network device 220 may determine the policy information based on locally stored policy information. The policy token may include information corresponding to policy information stored locally by network device 220. For example, a policy token including a first value may correspond to policy information indicating to quarantine client device 210, a policy token including a second value may correspond to policy information indicating to drop the message, a policy token indicating a third value may correspond to policy information indicating to notify a network administrator of the message, or the like. In this way, network device 220 may determine policy information based on locally storing the policy information, which may reduce a size and/or detectability of policy tokens attached to messages.

In some implementations, network device 220 may determine the policy information based on remotely stored policy information. For example, the policy token may indicate a particular network address, a particular device, a particular memory location, or the like, that from which the policy information is available. Network device 220 may request the policy information from the particular network address, device, memory location, or the like. In this way, network device 220 may determine policy information from a remote source, which may reduce local storage requirements of network device 220, and may improve network security by more securely storing the policy information.

In some implementations, network device 220 may determine the policy information based on decrypting the policy token. For example, the policy token may be encrypted, and may include the policy information, information corresponding to the policy information, and/or a location of the policy information. Network device 220 may decrypt the policy token (e.g., based on a security key provided to network device 220 and used by a device to encrypt the policy token) in order to determine the policy information. In this way, network device 220 may determine policy information based on decrypting the policy token, which may further impede a malicious party from accessing the policy information.

As further shown in FIG. 5, process 500 may include performing an action based on the policy information (block 530). For example, after determining the policy information from the policy token, network device 220 may perform an action based on the policy information. In some implementations, network device 220 may perform an action on the message (e.g., may redirect the message, may block the message, may replace the message with other information, etc.). In some implementations, network device 220 may perform an action related to the message (e.g., may monitor network traffic related to the message, may tag network traffic related to the message, etc.). In some implementations, network device 220 may store the message, the policy token, and/or information related to the message and/or the policy token.

In some implementations, the policy information may indicate to drop the message. For example, network device 220 may determine policy information that indicates to drop a message associated with a malicious party. Based on the policy information, network device 220 may drop (e.g., delete, not deliver, etc.) the message. In this way, network device 220 may prevent a malicious party from sending and/or receiving messages via network device 220, which may improve security of sensitive information and/or prevent the malicious party from tampering with client device 210.

In some implementations, the policy information may indicate to quarantine a source and/or a destination of the message. For example, network device 220 may determine policy information that indicates to quarantine client device 210 (e.g., based on client device 210 being a source or a destination of a message associated with a malicious party, based on client device 210 being compromised by the malicious party, or the like). In that case, network device 220 may quarantine client device 210. By quarantining client device 210, network device 220 may improve safety and/or security of other devices that communicate with client device 210 via network device 220.

In some implementations, the policy information may indicate to provide information to a user (e.g., a network administrator, a user of client device 210, or the like). For example, network device 220 may determine policy information that indicates to provide a warning to a user (e.g., a warning that client device 210 has been compromised, that client device 210 is attempting to provide a message to and/or receive a message from a malicious party, or the like). In that case, network device 220 may provide a warning to the user (e.g., to a network administrator associated with network device 220, to a user of client device 210, or the like). In this way, network device 220 may provide information to a user, which may permit the user to take action and/or refrain from an action related to the message.

In some implementations, the policy information may indicate to provide the message to the destination. For example, network device 220 may determine policy information that indicates to provide the message to the destination (e.g., the destination indicated by the message and/or by the existing communication channel). In that case, network device 220 may provide the message to the destination. In this way, network device 220 may provide a message to the destination of the message, which may allow network device 220 to permit transmission of messages not associated with a malicious party.

In some implementations, the policy information may indicate to add information related to the source and/or destination to a blacklist. For example, network device 220 may determine policy information that indicates to blacklist a source and/or a destination of a message. Based on the policy information, network device 220 may add information identifying the source and/or the destination to the blacklist, information identifying a reason for adding the source and/or the destination to the blacklist, information identifying a malicious party associated with the source and/or the destination to the blacklist, or the like. In this way, network device 220 may populate a blacklist with information related to sources, destinations, and/or malicious parties, which may improve network security in future encounters with the sources, destinations, and/or malicious parties.

In some implementations, the policy information may indicate to perform a combination of the above actions. For example, network device 220 may determine policy information that indicates to drop a message, to quarantine a source of the message, and/or to blacklist a destination of the message, or the like. In this way, network device 220 may perform combinations of actions based on policy information, which may allow a network administrator to provide a tailored set of rules to enforce network policy.

In some implementations, network device 220 may remove a policy token from a message based on the policy information. For example, network device 220 may receive a message and a policy token from a device (e.g., client device 210, network device 220, etc.). Network device 220 may perform an action based on policy information described by the policy token. Before providing the message to a destination of the message (e.g., client device 210, an external device, etc.), network device 220 may remove the policy token. By removing the policy token, network device 220 may prevent a malicious party (e.g., a malicious party that has compromised client device 210, a malicious party associated with the external device, etc.) from determining policy information that the malicious party may use to perform additional malicious acts, thereby improving security of the network.

In some implementations, multiple network devices 220 may associate different policy tokens with a message. For example, a first network device 220 may associate a first policy token that describes first policy information with a message, and may provide the message and the first policy token to a second network device 220. The second network device 220 may determine the first policy information and/or may perform a first action based on the first policy information. In some implementations, the second network device 220 may determine second policy information (e.g., based on the first policy information, based on performing the first action, etc.), may remove the first policy token from the message, and/or may associate a second policy token with the message. The second network device 220 may prove the message and the second policy token to a third network device 220 (e.g., for the third network device 220 to determine the second policy information based on the second policy token, to perform a second action based on the second policy information, to associate a third policy token with the message to cause a fourth network device 220 to perform a third action, etc.). In this way, a series of network devices 220 may associate multiple policy tokens with a message transmitted among the series of network devices 220, which may allow one or more network devices 220 of the series of network devices 220 to take different actions with respect to the message.

As further shown in FIG. 5, process 500 may include providing the message and/or the policy token toward the destination on the existing communication channel (block 540). For example, network device 220 may provide the message and/or the policy token toward the destination of the message on the existing communication channel. In some implementations, a first network device 220 may provide the message and the policy token to a second network device 220 (e.g., for routing to the destination). In such implementations, the second network device 220 may perform operations described herein in connection with FIG. 5. In some implementations, network device 220 may provide the message to client device 210 and/or to an external destination (e.g., a destination external to a network that includes network device 220). In such implementations, network device 220 may not provide the policy token, which may conceal the policy information from a malicious party associated with client device 210 and/or the external destination.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
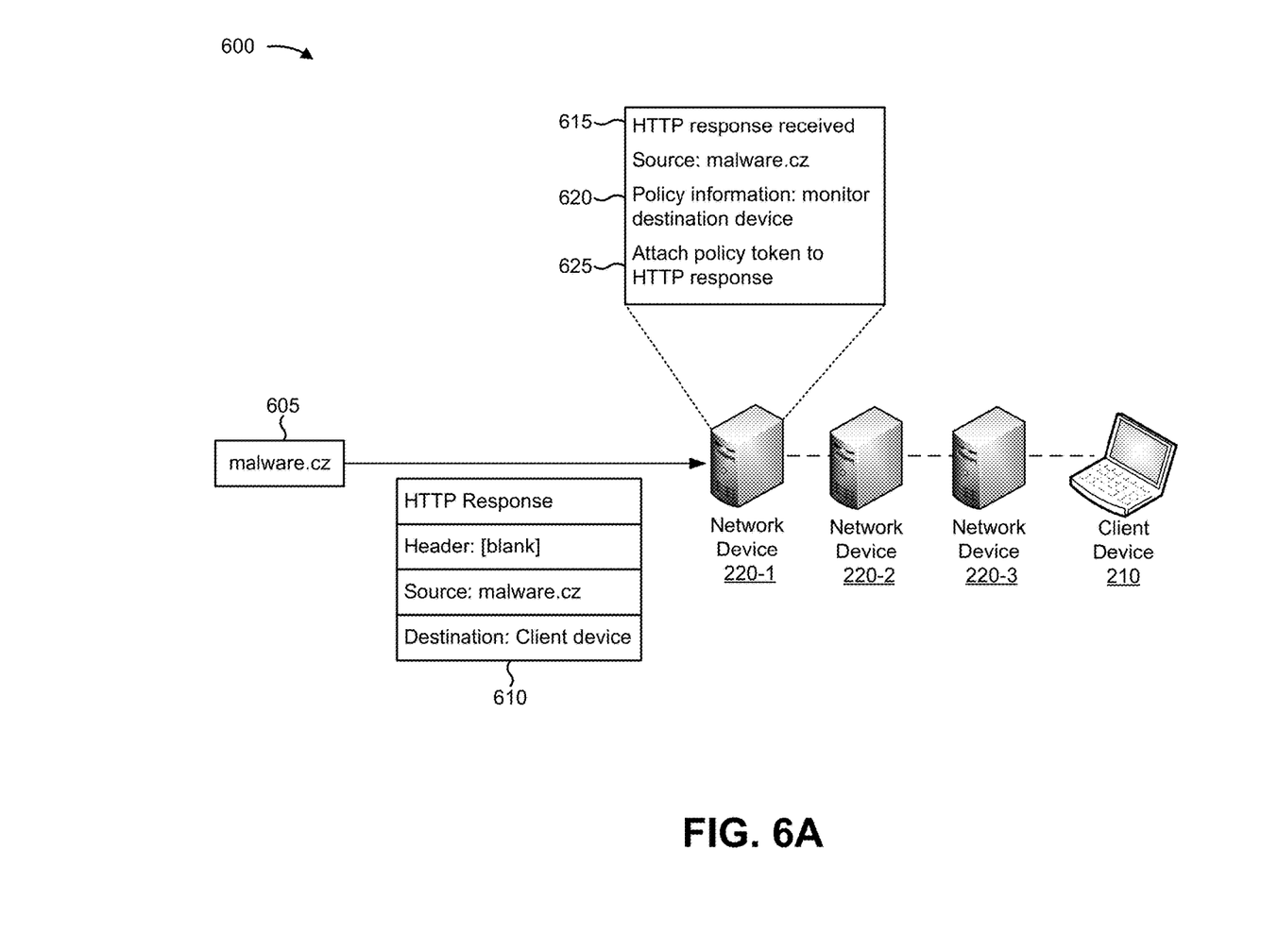
FIGS. 6A and 6B are diagrams of an example implementation relating to the example processes shown in FIGS. 4 and 5.
Figure 6B:
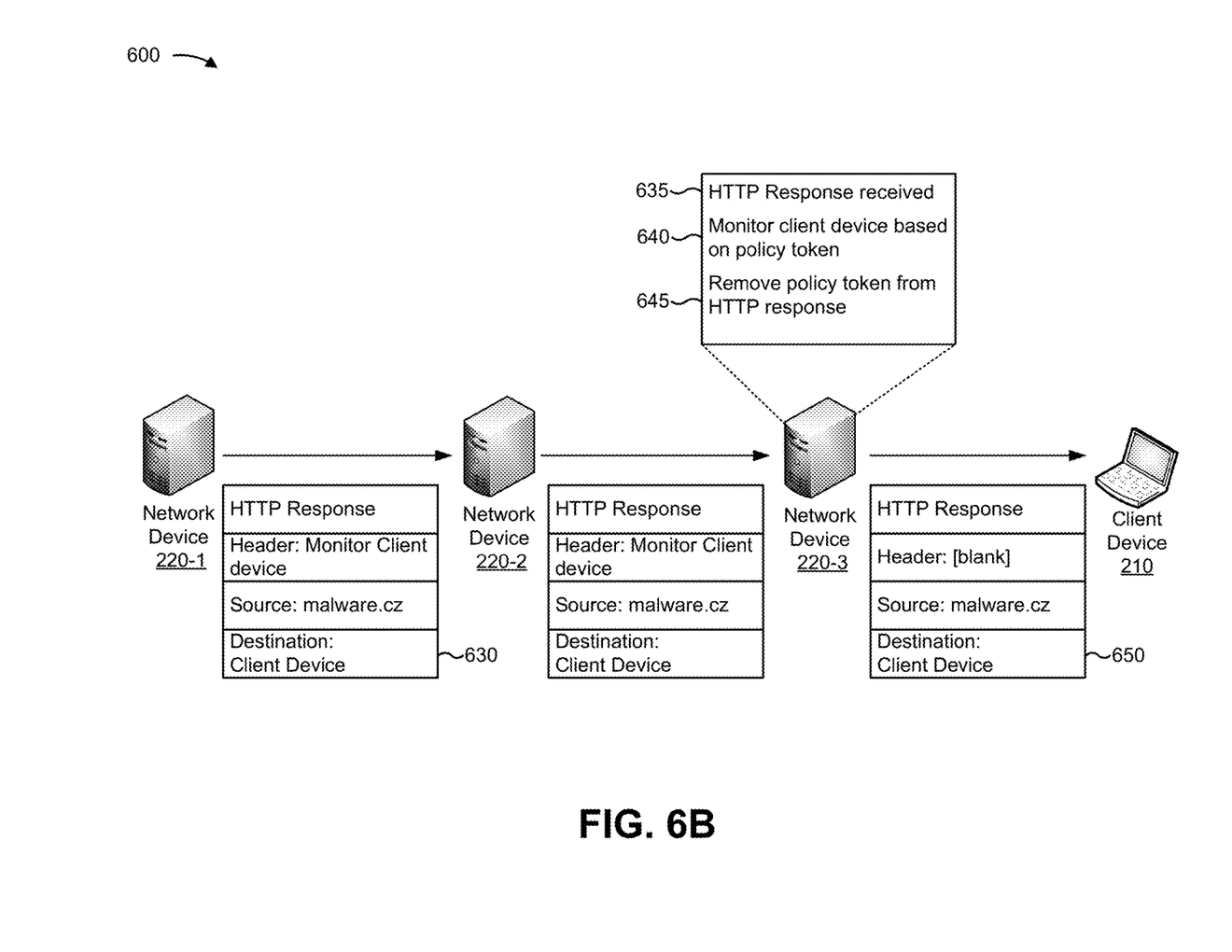

FIGS. 6A and 6B are diagrams of an example implementation 600 relating to example process 400 shown in FIG. 4 and relating to example process 500 shown in FIG. 5. FIGS. 6A and 6B show an example of attaching a policy token to a message received from an external source, providing the message and the policy token, and performing an action based on the policy token. For the purpose of FIGS. 6A and 6B, assume that client device 210 is compromised by a malicious party associated with an external source of "malware.cz."

As shown in FIG. 6A, and by reference number 605, assume that an external source (e.g., shown as "malware.cz") generates a message. As shown by reference number 610, the external source may provide the message (e.g., shown as "HTTP Response") on an existing communication channel toward client device 210 (e.g., shown by a dotted line from network device 220-1, continuing through network device 220-2 and network device 220-3, and ending at client device 210). As further shown, the message may include a header (e.g., shown as a blank header), a source (e.g., shown as "malware.cz"), and a destination (e.g., shown as "Client device").

As shown by reference number 615, network device 220-1 may receive the message. As further shown, network device 220-1 may determine a source of the message (e.g., based on the source identified by the message). As shown by reference number 620, network device 220-1 may determine policy information associated with the source and/or the destination of the message. Assume that network device 220-1 determines the policy information based on locally stored information that indicates that the source of the message (e.g., malware.cz) is associated with a malicious party. As shown, the policy information may indicate to monitor a destination device (e.g., client device 210). As shown by reference number 625, network device 220-1 may attach a policy token to the message. Assume that the policy token describes the policy information.

As shown in FIG. 6B, and by reference number 630, network device 220-1 may provide the message and the policy token to network device 220-2. As shown, the policy token may be included in the header associated with the message (e.g., as a string indicating to monitor client device 210). Assume that network device 220-2 determines the policy information indicated by the policy token. As shown, assume that network device 220-2 provides the message and the policy token to network device 220-3 on the existing communication channel associated with the HTTP response.

As shown by reference number 635, network device 220-3 may receive the message. As shown by reference number 640, network device 220-3 may determine policy information based on the policy token. Here, network device 220-3 determines to monitor client device 210 based on the policy token. As shown by reference number 645, network device 220-3 may determine to remove the policy token from the message before providing the message to client device 210 (e.g., to conceal, from the malicious party that compromised client device 210, the policy information indicating to monitor client device 210). Assume that network device 220-3 removes the policy token from the header associated with the message. As shown by reference number 650, network device 220-3 may provide the message, without the policy token, to client device 210. Network device 220-3 may thereafter monitor client device 210 based on the policy information described by the policy token.

As indicated above, FIGS. 6A and 6B are provided merely as an example. Other examples are possible and may differ from what was described with regard to FIGS. 6A and 6B.

Systems and/or methods, described herein, may enable network devices to intercommunicate policy information using messages transmitted on an existing communication channel. The existing communication channel may be necessary to a function of a client device, which may ensure that messages are regularly transmitted on the existing communication channel. Network devices associated with the existing communication channel may intercommunicate policy information using policy tokens associated with (e.g., attached to, inserted in, etc.) the messages, and may conceal the policy information from the client device and/or a malicious party by removing the policy tokens before providing the messages to the destination.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
  receive a message for routing to a destination on a communication channel,
    the device being a first network device, and
    the communication channel having been established between a source of the message and the destination;
  determine first policy information related to at least one of the message, the destination, or the source of the message,
    the first policy information describing a first action for a second network device to perform, and
    the first policy information being determined based on one or more of:
      a blacklist that lists one or more of sources or destinations that are to be blocked or banned,
      a whitelist that lists one or more of sources or destinations that are deemed acceptable, or
      a graylist the lists one or more of sources or destinations that are subject to a particular rule;
  associate a first policy token with the message based on the first policy information,
    the first policy token including information identifying a different device that stores the first policy information for the second network device; and
  provide the message with the first policy token to the second network device on the communication channel to cause the second network device to request the first policy information from the different device based on the first policy token,
    second policy information being determined by the second network device after the second network device receives the message with the first policy token,
    the first policy token being removed by the second network device after the second network device receives the message with the first policy token,
    a second policy token being associated with the message based on the second policy information,
    the message being provided with the second policy token by the second network device to a third network device,
    a second action being performed by the third network device based on the second policy information after the third network device receives the message with the second policy token, and
    the second action including one of:
      dropping the message,
      monitoring the source of the message,
      quarantining the source of the message, or
      redirecting traffic to or from the source of the message.

2. The device of claim 1,
where the one or more processors, when receiving the message, are further to:
  receive first the policy token with the message; and
where the one or more processors, when determining the first policy information, are to:

determine the first policy information based on the first policy token.

3. The device of claim 1,
where the device is associated with a first network; and
where the second network device is associated with a second network,
the second network being a network other than the first network.

4. The device of claim 1,
where the one or more processors, when associating the first policy token with the message, are further to:
encrypt the first policy token to prevent a malicious party from determining the first policy information; and
where the message with the associated first policy token further cause the second network device to decrypt the first policy token.

5. The device of claim 4, where the encrypting and the decrypting are performed using at least one of:
a symmetric-key algorithm, or
a public key algorithm.

6. The device of claim 1, where the one or more processors, when associating the first policy token with the message, are further to:
attach the first policy token to the message, or
insert the first policy token into a portion of the message.

7. The device of claim 1, where the first policy token is removed from a header associated with the message.

8. A non-transitory computer-readable medium storing instructions, the instructions comprising:
one or more instructions that, when executed by one or more processors of a device, cause the one or more processors to:
receive a message for routing to a destination on a communication channel,
the device being a first network device, and
the communication channel having been established between a source and the destination;
determine first policy information related to the message,
the first policy information describing a first action for a second network device to perform,
the first policy information being determined based on one or more of:
a blacklist that lists one or more of sources or destinations that are to be blocked or banned,
a whitelist that lists one or more of sources or destinations that are deemed acceptable, or
a graylist the lists one or more of sources or destinations that are subject to a particular rule, and
the first policy information describing information related to at least one of the destination or the source;
associate, with the message and based on the first policy information, a first policy token that includes information that identifies a different device that stores the first policy information for the second network device; and
provide the message and the first policy token to the second network device on the communication channel to permit the second network device to request the first policy information from the different device based on the first policy token,
second policy information being determined by the second network device after the second network device receives the message with the first policy token,
a second policy token being associated with the message based on the second policy information,
the message being provided with the second policy token by the second network device to a third network device,
a second action being performed by the third network device based on the second policy information after the third network device receives the message with the second policy token, and
the second action including one of:
dropping the message,
monitoring the source,
quarantining the source, or
redirecting traffic to or from the source.

9. The non-transitory computer-readable medium of claim 8,
where the device is associated with a first network; and
where the second network device is associated with a second network,
the second network being a network other than the first network.

10. The non-transitory computer-readable medium of claim 8,
where the one or more instructions, that cause the one or more processors to receive the message, further cause the one or more processors to:
receive the first policy token with the message; and
where the one or more instructions, that cause the one or more processors to determine the first policy information, further cause the one or more processors to:
determine the first policy information based on the first policy token.

11. The non-transitory computer-readable medium of claim 8,
where the one or more instructions, when executed by the one or more processors, further cause the one or more processors to:
encrypt the first policy token to prevent a malicious party from determining the first policy information; and
where the message and the first policy token further cause the second network device to decrypt the first policy token.

12. The non-transitory computer-readable medium of claim 11, where the encrypting and the decrypting are performed using at least one of:
a symmetric-key algorithm, or
a public key algorithm.

13. The non-transitory computer-readable medium of claim 8, where the one or more instructions, that cause the one or more processors to associate the first policy token with the message, further cause the one or more processors to:
attach the first policy token to the message, or
insert the first policy token into a portion of the message.

14. The non-transitory computer-readable medium of claim 8, where the one or more instructions further cause the one or more processors to:
remove the first policy token from a header associated with the message before providing the message on the communication channel.

15. A method, comprising:
receiving, by a device, a message for routing to a destination on a communication channel,
  the device being a first network device, and
  the communication channel having been established between a source and the destination;
determining, by the device, first policy information associated with at least one of the message, the source, or the destination,
  the first policy information describing a first action for a second network device to perform, and
  the first policy information being determined based on one or more of:
    a blacklist that lists one or more of sources or destinations that are to be blocked or banned,
    a whitelist that lists one or more of sources or destinations that are deemed acceptable, or
    a graylist the lists one or more of sources or destinations that are subject to a particular rule;
associating, by the device, the message with a first policy token based on the first policy information,
  the first policy token including information identifying a different device that stores the first policy information for the second network device; and
providing, by the device, the message and the first policy token to the second network device on the communication channel to permit or cause the second network device to request the first policy information from the different device based on the first policy token,
  second policy information being determined by the second network device after the second network device receives the message with the first policy token,
  a second policy token being associated with the message based on the second policy information,
  the message being provided with the second policy token by the second network device to a third network device,
  a second action being performed by the third network device based on the second policy information after the third network device receives the message with the second policy token, and
  the second action including one of:
    dropping the message,
    monitoring the source,
    quarantining the source, or
    redirecting traffic to or from the source.

16. The method of claim 15,
where receiving the message further comprises:
  receiving the first policy token with the message; and
where determining the first policy information comprises:
  determining the first policy information based on the first policy token.

17. The method of claim 16, where receiving the message and the first policy token comprises:
  receiving the message and the first policy token from the source,
    the source providing the message and the first policy token based on the source being compromised by a malicious party.

18. The method of claim 15, where associating the first policy token with the message further comprises:
  including the first policy token in the message, or
  attaching the first policy token to the message.

19. The method of claim 15, further comprising:
  encrypting the first policy token to impede a malicious party from determining the first policy information; and
  where providing the first policy token to the second network device comprises:
    providing the first policy token to the second network device to permit the second network device to decrypt the first policy token.

20. The method of claim 15, further comprising:
  removing the first policy token from a header associated with the message before providing the message on the communication channel.

\* \* \* \* \*